(12) United States Patent
Michaud

(10) Patent No.: US 12,260,268 B2
(45) Date of Patent: Mar. 25, 2025

(54) HIGH-PERFORMANCE REMOTE ATOMIC SYNCHRONIZATION

(71) Applicant: Dell Products L.P., Round Rock, TX (US)

(72) Inventor: Adrian Michaud, Carlisle, MA (US)

(73) Assignee: Dell Products L.P., Round Rock, TX (US)

( * ) Notice: Subject to any disclaimer, the term of this patent is extended or adjusted under 35 U.S.C. 154(b) by 67 days.

(21) Appl. No.: 17/648,515

(22) Filed: Jan. 20, 2022

(65) Prior Publication Data

US 2023/0229525 A1 Jul. 20, 2023

(51) Int. Cl.
*G06F 9/46* (2006.01)
*G06F 9/52* (2006.01)

(52) U.S. Cl.
CPC ........ *G06F 9/526* (2013.01); *G06F 2209/521* (2013.01)

(58) Field of Classification Search
CPC ..... G06F 9/526; G06F 9/522; G06F 2209/521
See application file for complete search history.

(56) References Cited

U.S. PATENT DOCUMENTS

| | | | | |
|---|---|---|---|---|
| 5,544,332 A * | 8/1996 | Chen | ........................ | G06F 9/524 710/110 |
| 6,192,408 B1 * | 2/2001 | Vahalia | ............... | G06F 16/1774 709/217 |
| 6,411,983 B1 * | 6/2002 | Gallop | ...................... | G06F 9/52 718/107 |
| 7,886,300 B1 * | 2/2011 | Long | ...................... | G06F 9/5016 710/200 |
| 9,672,152 B2 * | 6/2017 | Hahnenberg | ........ | G06F 9/45529 |
| 11,487,594 B1 * | 11/2022 | Ehmann | .................. | G06F 9/544 |
| 11,500,693 B2 * | 11/2022 | Kim | ...................... | G06F 9/5005 |
| 2003/0217092 A1 * | 11/2003 | Veselov | .................... | G06F 9/52 718/104 |
| 2004/0088573 A1 * | 5/2004 | Jeyaram | .................... | G06F 9/52 713/167 |
| 2005/0066046 A1 * | 3/2005 | Chadalapaka | .......... | H04L 69/32 709/230 |
| 2005/0081204 A1 * | 4/2005 | Schopp | .................. | G06F 9/526 718/100 |
| 2006/0117316 A1 * | 6/2006 | Cismas | ................. | G06F 9/3851 718/103 |

(Continued)

FOREIGN PATENT DOCUMENTS

CN 106657365 A * 5/2017

*Primary Examiner* — April Y Blair
*Assistant Examiner* — Zhi Chen
(74) *Attorney, Agent, or Firm* — Workman Nydegger

(57) ABSTRACT

One example method may be performed in an operating environment including distributed and/or disaggregated compute nodes that communicate with each other and with a shared computing resource by way of an RDMA fabric. The method may include obtaining, by a first one of the compute nodes, ownership of an atomic synchronization object that controls access to the shared computing resource, using, by the first compute node, the shared computing resource until the shared computing resource is no longer needed by the first compute node, and when the shared computing resource is no longer needed by the first compute node, relinquishing, by the first compute node, the ownership of the atomic synchronization object.

14 Claims, 9 Drawing Sheets

(56) References Cited

U.S. PATENT DOCUMENTS

| | | | | |
|---|---|---|---|---|
| 2008/0005741 | A1* | 1/2008 | Terrell | G06F 9/526 |
| | | | | 718/102 |
| 2010/0083247 | A1* | 4/2010 | Kanevsky | G06F 9/45558 |
| | | | | 718/1 |
| 2010/0100889 | A1* | 4/2010 | Labrie | G06F 9/526 |
| | | | | 718/106 |
| 2013/0222402 | A1* | 8/2013 | Peterson | G06F 9/52 |
| | | | | 345/520 |
| 2015/0242324 | A1* | 8/2015 | Novakovic | G06F 12/0813 |
| | | | | 711/121 |
| 2015/0254113 | A1* | 9/2015 | Chiang | G06F 9/526 |
| | | | | 718/102 |
| 2017/0039094 | A1* | 2/2017 | Dice | G06F 9/526 |
| 2017/0199842 | A1* | 7/2017 | England | H04L 49/9005 |
| 2019/0042518 | A1* | 2/2019 | Marolia | G06F 13/4221 |
| 2019/0205244 | A1* | 7/2019 | Smith | G06F 3/065 |

* cited by examiner

HIGH-PERFORMANCE REMOTE ATOMIC SYNCHRONIZATION

FIELD OF THE INVENTION

Embodiments of the present invention generally relate to remote atomic synchronization of resource usage. More particularly, at least some embodiments of the invention relate to systems, hardware, software, computer-readable media, and methods for reducing latency in the implementation of remote atomic synchronization processes for compute operations.

BACKGROUND

Low latency atomic synchronization objects, such as mutexes, spinlocks, and semaphores, may be used locally within the scope of a compute domain and are extensively used for process synchronization. Remote clustered and distributed and/or disaggregated compute operations also benefit from atomic synchronization. However, any latency associated with remote atomic synchronization has a significant amplification effect. The latency is further amplified by the number of participants trying to synchronize with each-other.

In general, atomic synchronization may have two basic goals, namely, maintenance of a consistent and coherent state of data and/or compute processes and operations, and provision of efficient serialization of operations and/or compute with minimal intervention and minimal overhead/latency. Some example problems associated with overhead and latency are discussed below.

Serialization of compute requires some form of a compute barrier, which can significantly impact any compute resources being blocked such that any latency associated with blocking/unblocking has a direct effect on the overall efficiency of the compute implementation. A compute barrier can be thought of as a gate that only allows one process or thread to access a given resource at a time. The latency can be thought of as the time it takes to open, close, and maintain only one resource inside of the gate at a time. A local compute barrier may be relatively trivial to implement using atomic test and set instructions that will yield relatively low latency.

However, a remote compute barrier is traditionally implemented using an atomic network-based message, or remote procedure call (RPC) that responds differently depending on whose request was received or processed first relative to other requests. The network latency will significantly amplify the latency in this case to levels that might catastrophically affect the overall performance of the barrier. For this reason, many applications simply cannot, or will not attempt to implement atomic synchronization for compute over any type of network due to the non-deterministic latency.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
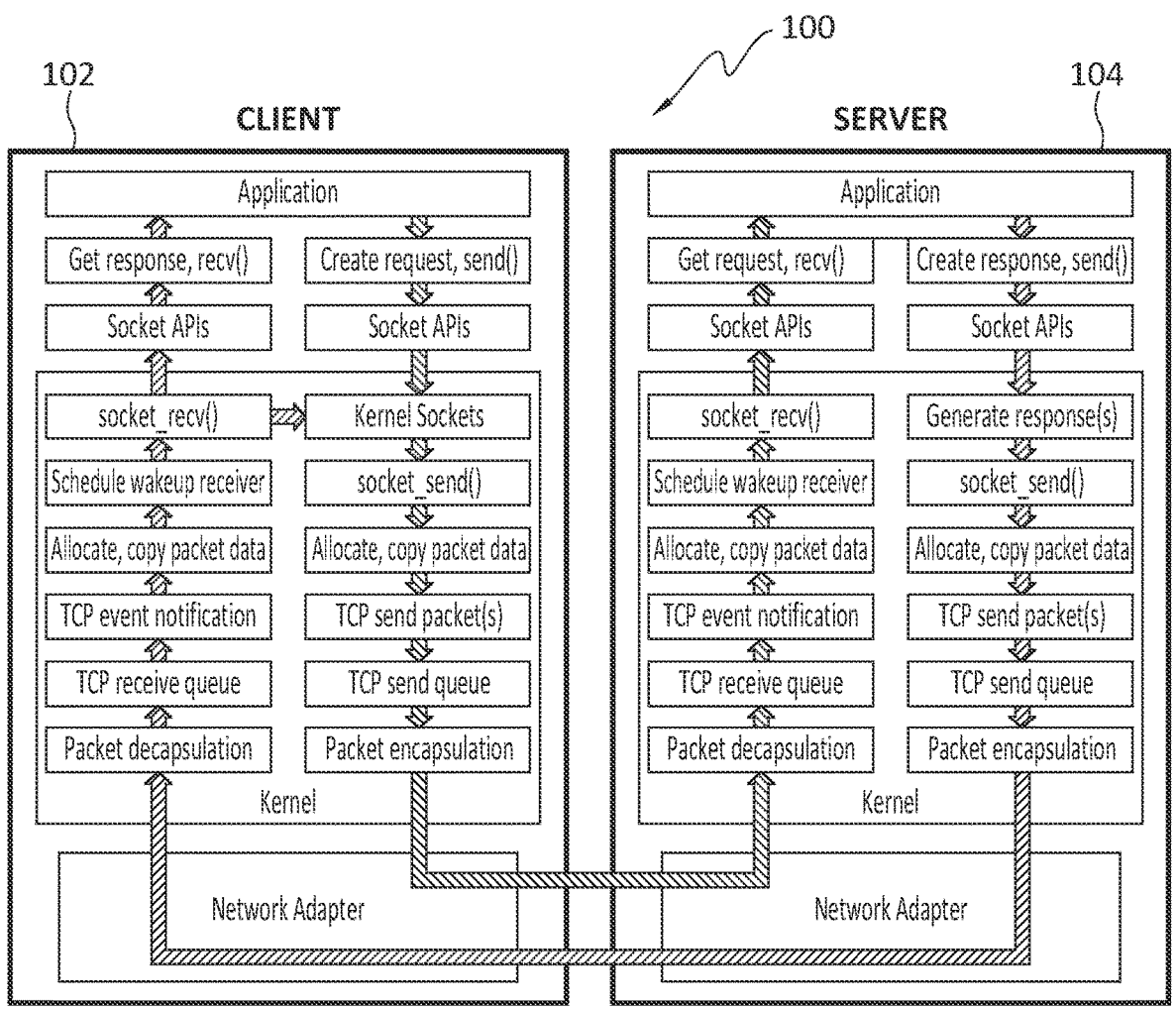
FIG. 1 discloses aspects of conventional client server message passing.

Embodiments of the present invention generally relate to remote atomic synchronization of resource usage. More particularly, at least some embodiments of the invention relate to systems, hardware, software, computer-readable media, and methods for reducing latency in the implementation of remote atomic synchronization processes for compute operations.

Atomic synchronization techniques, using synchronization objects such as semaphores, mutexes, critical sections (code segments that can only be accessed by one process at a time), and spin locks, for example, are important for maintaining data consistency and process synchronization for many aspects of compute and data processing in general. Thus, example embodiments of the invention embrace, among other things, techniques for remote atomic synchronization, or process synchronization, that provide low enough latency to provide a significant benefit for high-performance clustered and distributed/disaggregated compute that require such. In more detail, example embodiments include semaphores, mutexes, critical sections, and spin locks suitable for high-performance clustered and distributed/disaggregated compute using current and future high-performance InfiniBand/RDMA (Remote Direct Memory Access) based fabrics.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

For example, an embodiment may implement low latency remote atomic synchronization processes performed as part of disaggregated and/or distributed compute operations. Thus, an embodiment may enable efficient and effective use of compute resources in the performance of such operations. An embodiment of the invention may enable use, in a distributed network or clustered compute environment, of atomic synchronization processes by applications and/or other entities that typically have not employed such processes due to the unacceptable latency that arises or would be expected due to the distributed and/or remote nature of the compute environment. Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Comparative Example

Following is a discussion of a comparative example of a conventional approach that aids in the illustration of various features and aspects of example embodiments. With particular reference to FIG. 1, the configuration 100 includes a client 102 and a server 104 that communicate with each other. This hypothetical configuration 100 of FIG. 1 may implement the client 102/server 104 communications using messaging, RPCs (Remote Procedure Calls), or other techniques. Regardless of the communication technique however, the approach set forth in FIG. 1 will always have significant latency when used as a foundational exchange for implementing any type of atomic synchronization.

In particular, the approach in FIG. 1 uses network stack(s) as the foundation for implementing an atomic operation which means that compute synchronization will yield whatever the typical network latency yields, which is non-deterministic, and potentially very high. This is the main reason that many existing applications or architectures do not attempt to synchronize latency sensitive resources, like compute, with remote atomic synchronization. As a practical matter, this means compute resources could easily be delayed with milliseconds of latency instead of nanoseconds. Consequentially, remote synchronization objects like mutexes, critical sections, and semaphores are not viable for many clustered and distributed and/or disaggregated compute nodes.

B. Aspects of Some Example Embodiments

In general, some example embodiments are directed to methods for clustered and distributed/disaggregated compute that need to partake in remote atomic synchronization. Atomic synchronization objects such as a remote semaphore, mutex, critical section, or spin lock, are commonly used locally within the scope of a compute domain and are extensively used for process synchronization. However, their use becomes impractical when synchronization is needed among remotely distributed and/or disaggregated compute entities. The difficulty becomes apparent when low latency is needed. Particularly, it may be very difficult to implement remote atomic synchronization with low latency, defined herein as sub-microsecond delay.

Example embodiments may thus operate to provide remote atomic synchronization with the lowest possible latency using high-performance InfiniBand/RDMA based fabrics, for example. Some embodiments may provide a set of remote atomic synchronization objects that provide very low latency and may enable the use of emerging high-performance clustered and distributed/disaggregated compute architectures, among others.

The following illustrative example demonstrates how example embodiments may create high-performance remote atomic synchronization objects using current high-performance RDMA based fabrics as well as emerging or future RDMA based fabrics like Gen-Z, and CXL (Compute Express Link). Example embodiments are directed to techniques that may work for RDMA adapters and other high-performance fabrics that support native atomic operations. This disclosure is largely directed to illustrating how a mutex or critical section may be implemented in this example. Note that some embodiments are directed to a semaphore that may be built on-top of mutexes such as are disclosed herein. Further, a spinlock may be almost identical to a mutex, except that there is a polling aspect to the spinlock, as compared to a reschedule of compute resources. Thus, some example embodiments may be directed to spinlocks that are based on one of the disclosed mutexes.

The present disclosure may employ a variety of terms in describing aspects of example embodiments. Definitions for some of these terms are set forth hereafter.

RDMA. Remote Direct Memory Access—in general, this involves direct memory access from memory of a computer into memory of another computer—the operating systems of the two computers are not involved in RDMA, thus allowing high throughput and low latency operations.

Atomic. When an atomic fetch or store is performed on shared memory, no other concurrent fetch or store can observe the modification half-complete.

Semaphore. An abstract object used to control access to a resource.

Mutex. Provides exclusive access to a shared resource through use of a lock/unlock serialization mechanism—a mutex is a data structure that may comprise a blob of memory with a group of consecutive addresses.

Critical section. The same as a mutex, but usually referring to a "critical" section of "code."

Spinlock. A form of a mutex, but usually does not involve rescheduling when a resource is busy—instead a form of polling or spinning is used to wait for a resource to become available.

Client. The application or the system that is performing file I/O.

Server(s). The system(s) that provide file system meta data or file system block data.

Write verb. RDMA write into remote registered memory.

Post verb. RDMA write into remote non-registered memory.

Verb. A term used to describe InfiniBand RDMA operations.

RPC. Remote Procedure Call.

RNIC. RDMA capable network interface card.

Stack. A term used to describe layers of software or layers of hardware.

UDP. User Datagram Protocol (unreliable).

RID. Remote ID for RDMA registered memory.

LID. Local ID for RDMA registered memory.

SWAP. A process of exchanging (atomically) data to-from a client and remote server.

FETCH and ADD. A process of atomically adding and storing the result of a memory location on a remote server and returning the result to the client.

TCP. Transmission Control Protocol (reliable).

Nanosecond (ns). One billionth of a second.

Sub-microsecond (μs). Less than one millionth of a second. One microsecond is also equivalent to 1000 nanoseconds.

By way of brief background for some example embodiments, a group of applications or entities may each need access to certain shared resources such as, for example, disks, memory, and storage. For example, a single application, or a group of applications, may have multiple threads of execution that each need access to a shared resource.

Because all of the entities that need the resource cannot use the resource at the same time, due to hardware, processing, or other, practicalities, there is a need to impose resource contention so that only one thread at a time is able to access and use the resource. This control may be implemented by way of synchronization objects, such as a mutex (mutually exclusive) object, or simply a 'mutex.' In general, the entity that owns or possesses the mutex has exclusive access to the shared resource in question until that entity relinquishes control of the mutex to another waiting entity or, where there are no waiting entities, or 'waiters,' until the entity is finished using the resource. While this resource contention is manageable in circumstances where the various participants are co-located, significant problems arise with management of the resource when the entities need to share, for example, a remote server. The problems are further aggravated in large networks where there are multiple users and entities, and where latency in network communications between entities becomes a significant factor in the performance of the system.

Particularly, because it is often a goal to minimize the amount of time required for an entity to find out if a resource is available to it, the latency imposed by a geographically dispersed network where entities may be located at great distances from each other and/or from the resources, with a multitude of users, becomes a significant disincentive to attempt to obtain access to the shared resource. That is, the latency adversely affects performance of the applications and entities that need to share the resource. Consequently, conventional systems tend to be designed to operate in a way that avoids the need for synchronization between systems that need access to a resource.

Thus, some example embodiments are directed to approaches for reducing latency in network communications so that a group of entities may effectively and efficiently employ one or more shared resources. Following are some illustrative examples.

B.1 Remote Mutex/Critical Section Example

Figure 2:
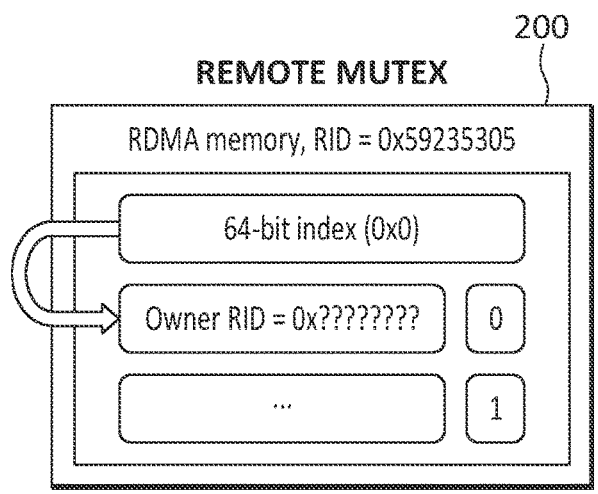
FIG. 2 discloses aspects of a remote mutex.

One RDMA memory location within a cluster or distributed/disaggregated compute node may be destined to contain and hold a remotely shared 64-bit mutex index, as shown in the example remote mutex 200, or simply 'mutex 200,' disclosed in FIG. 2. All clients/nodes that wish to partake in this remote mutex 200 may have to obtain and pre-register the remote mutex 200 RDMA memory ID (RID). The remote mutex 200 memory may also contain an empty table that is indexable by the 64-bit mutex value. The size of the table may be pre-determined and may define the maximum number of unique waiters for this remote mutex 200, that is, the maximum number of entities that may be waiting for use of the shared resource associated with the remote mutex 200. If the remote mutex 200 is expected to handle, for example, up to 1000 different clients, all contending to own this remote mutex 200, then the remote mutex 200 memory should be allocated such that there is one shared 64-bit mutex value plus at least 1001 consecutive 64-bit memory slots immediately following the 64-bit mutex value. In practice, a remote mutex 200 that can manage 1000 contending waiters may have to allocate 16,032 bytes of RDMA memory (64-bit index+64-bit owner+64-bit waiter*1000). Note that the remote mutex 200 memory contents may initially be set to zero which indicates that no entity owns the remote mutex 200.

Figure 3:
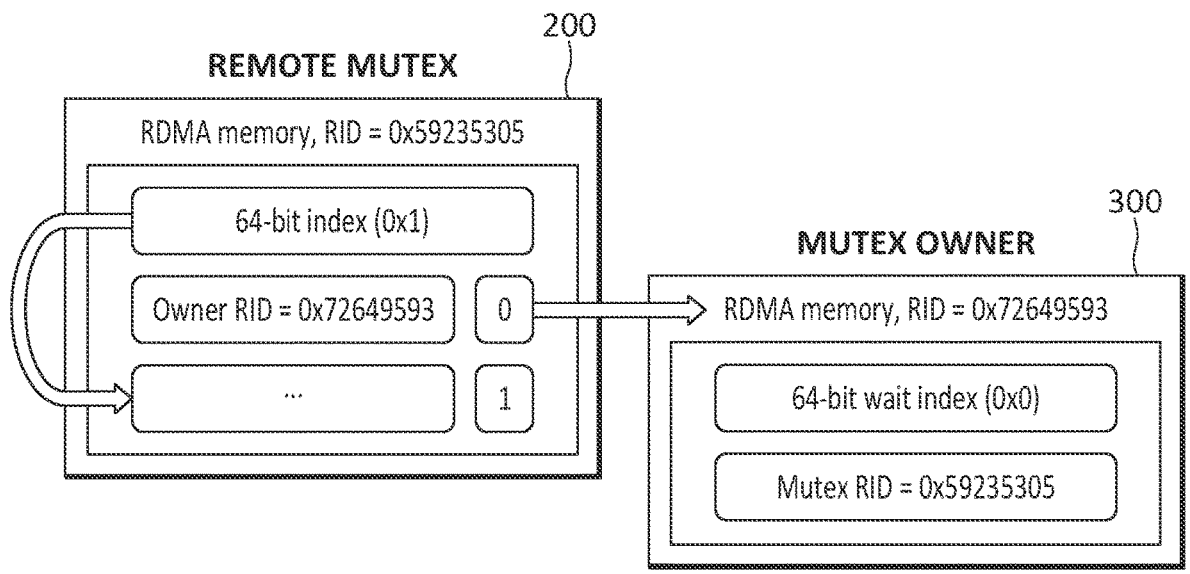
FIG. 3 discloses an arrangement of a mutex and mutex owner.

Continuing with the example of FIG. 2, and directing attention now to FIG. 3 as well, the remote mutex 200 shared 64-bit value is used to decide remote mutex 200 ownership as well as to establish the remote mutex 200 wait list for requesters, or waiters, waiting for ownership of the remote mutex 200. When remote mutex 200 ownership is requested, a remote client will issue an atomic RDMA fetch and add verb that fetches and adds a value of 1 to the remote 64-bit index. Note that with respect to atomic processes, such as the fetch and add process, an atomic process is performed by a single entity only and is not interrupted by other processes or entities. While an atomic process is being performed, no other entity can access the shared resource until that atomic process is completed.

Particularly, the atomic fetch and add operation will (1) fetch the current value of the 64-bit index from the mutex 200, (2) atomically add 1 to the current value of the 64-bit index, and (3) store the sum in the 64-bit index of the remote mutex 200, as well as return the resulting sum to the client that issued the RDMA fetch and add verb. If that client is the first, and only, ownership request, then a value of 1 will be returned and the client can assume that it has exclusive ownership of the mutex. At this point, the client may be deemed as being the mutex owner 300. The client may optionally write a unique ID, such as the client remote memory ID for example, into the first slot (offset 0 after the 64-bit index) in the memory of the remote mutex 200. Thus, if there is a need to debug software, for example, the initial owner of the remote mutex 200 is trackable in the memory of the remote mutex 200.

Figure 4:
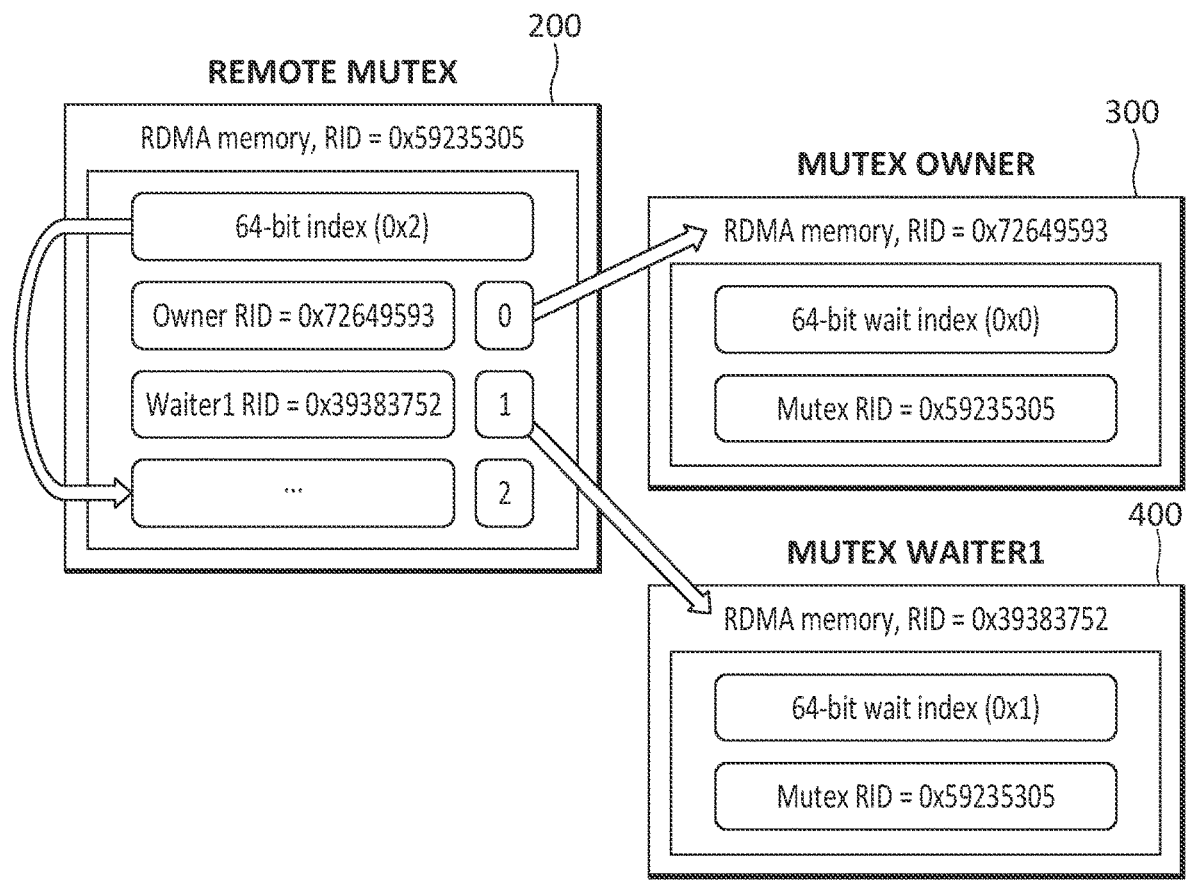
FIG. 4 discloses an arrangement that includes a mutex, a mutex owner, and a mutex waiter.

With attention now to FIG. 4, details are provided concerning how resource contention between multiple entities may be handled in some embodiments. In the example of FIG. 4, the mutex owner 300 owns the mutex 200, and there is another client 400, denoted as 'Mutex Waiter 1,' that is waiting for access to the remote mutex 200.

In the example of FIG. 4, the client 400 tries to take ownership of the mutex but the current 64-bit index value is greater than 0, so a value of 1 is added to the 64-bit index value and atomically stored in memory and the sum is returned to the client. The client 400 knows that a value greater than 1 means that it was not granted ownership, because the current owner 300 of the mutex is associated with the index value of 1, and so the client 400 must to wait to be signaled that the mutex 200 has become available.

The client 400 may now use the index value that was returned, 2 in this case, in response to the atomic fetch and add issued by the client 400, and perform an atomic compare and swap of the memory using the index. The client 400 may perform an atomic compare with the 0 value and swap with the client registered RDMA wait memory (RID=0x39383752) as shown in FIG. 4.

In general, a compare and swap process may involve checking, by a thread or process, the contents of a remote memory location, such as a memory slot of a mutex, for a given value, such as 0 for example. If the remote memory location does contain the specified value of 0, then a new swap value is written by the thread, such as 1 for example, and the compare-and-swap is successful. That is, only if the contents of the remote memory location match the given value, are the contents of the memory slot then swapped with a new given value that is written by the thread to the memory slot.

On the other hand, if the remote memory location does not contain the specified value, then the compare-and-swap is unsuccessful, and the current value of the remote memory location is simply returned to the thread or process that initiated the compare and swap, and now swap of that current value is performed. Because the compare and swap is an atomic process, multiple threads can perform a compare/swap at the same time to the same remote memory, but only one complete compare/swap is allowed to happen at a time by the hardware.

As discussed in further detail elsewhere herein, example embodiments of the invention may use the compare/swap process to take ownership, or release ownership, of a remote resource. It is noted that the compare-and-swap is being performed atomically by the hardware which, as used herein, refers to the hardware supporting the atomic compare and swap. To illustrate, RDMA network adapters may support compare-and-swap RDMA operations. As another example, the PCI express bus also supports compare-and-swap. Thus, an RDMA network adapter using a PCI express bus will fully support atomic compare-and-swap at the hardware level which guarantees that any clients that perform an RDMA based compare-and-swap operations get an atomic compare-and-swap.

The following example is illustrative of a compare-and-swap:

Compare a remote memory location with the value of 0, and swap with the value of 1 . . . .
If the remote memory location contains a 0, then it is changed to a 1 and <<success>> is returned, meaning the compare+swap was successful.
—or—
If the remote memory location does not contain a 0, then the compare+swap failed, and the current memory location value is returned.

In the illustrative example of FIG. 4, the target of the compare and swap is the value of the index, 2 in this case, minus 1 (index−1), which is equal to 1. If the compare with 0 fails, then this is a race condition and the current owner of the mutex 200 is in the process of selecting the client 400 as the new owner of the mutex 200. This is confirmed if the compare and swap with 0 fails and returns a value of 1 to the client 400. If a value of 1 is returned by the compare and swap process, the client 400 is now the new owner of the mutex 200. The RID of the client 400 should now be written over the current value of 1 and the client 400 becomes the new owner. On the other hand, if the compare with 0 and swap with its RID does succeed, then the client 400 now blocks/yields and waits for a zero-length posted write to the associated mutex waiter memory (RID=0x39383752), as shown in FIG. 4.

Figure 5:
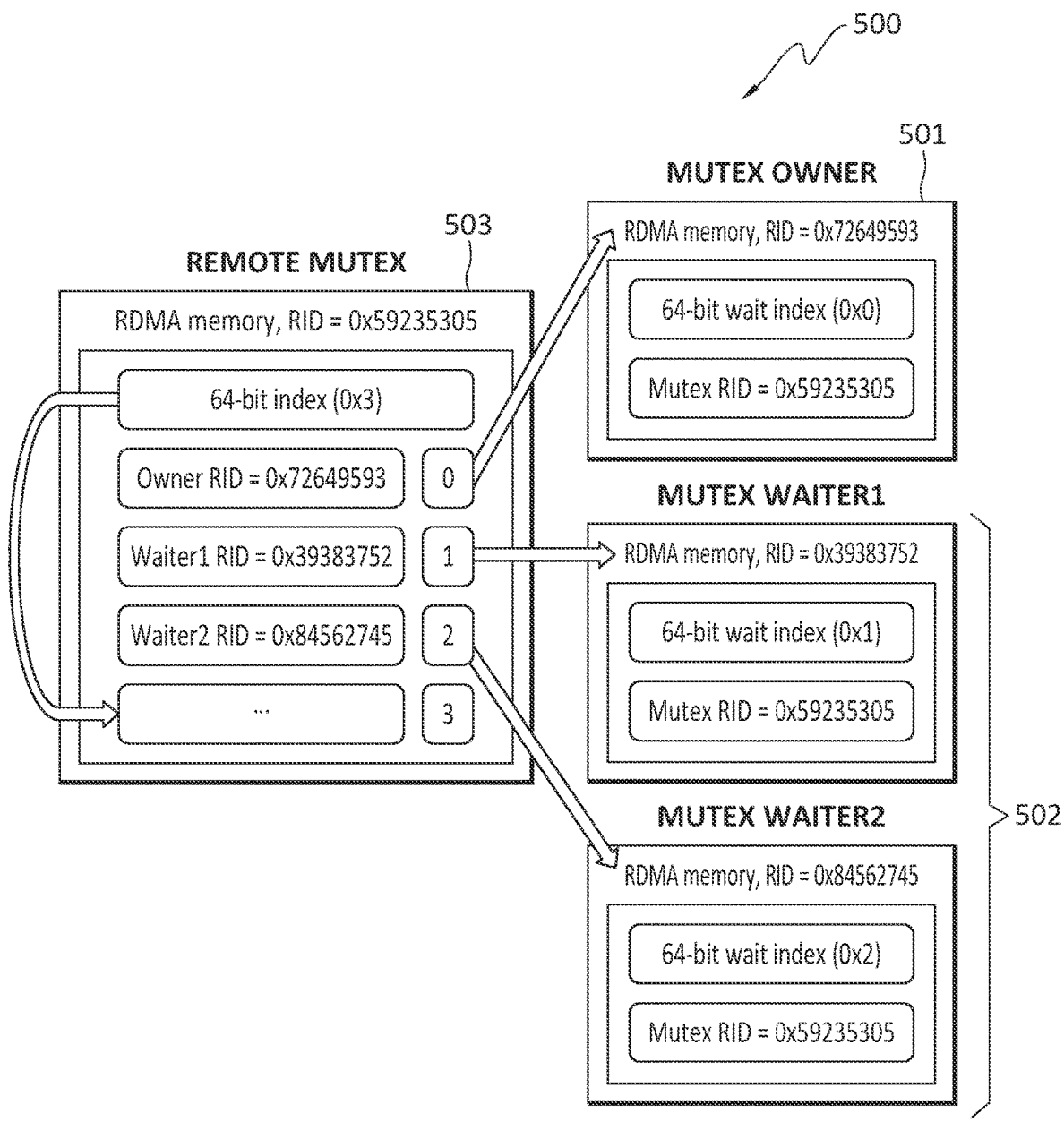
FIG. 5 discloses an arrangement in which multiple mutex waiters accumulate.
Figure 6:
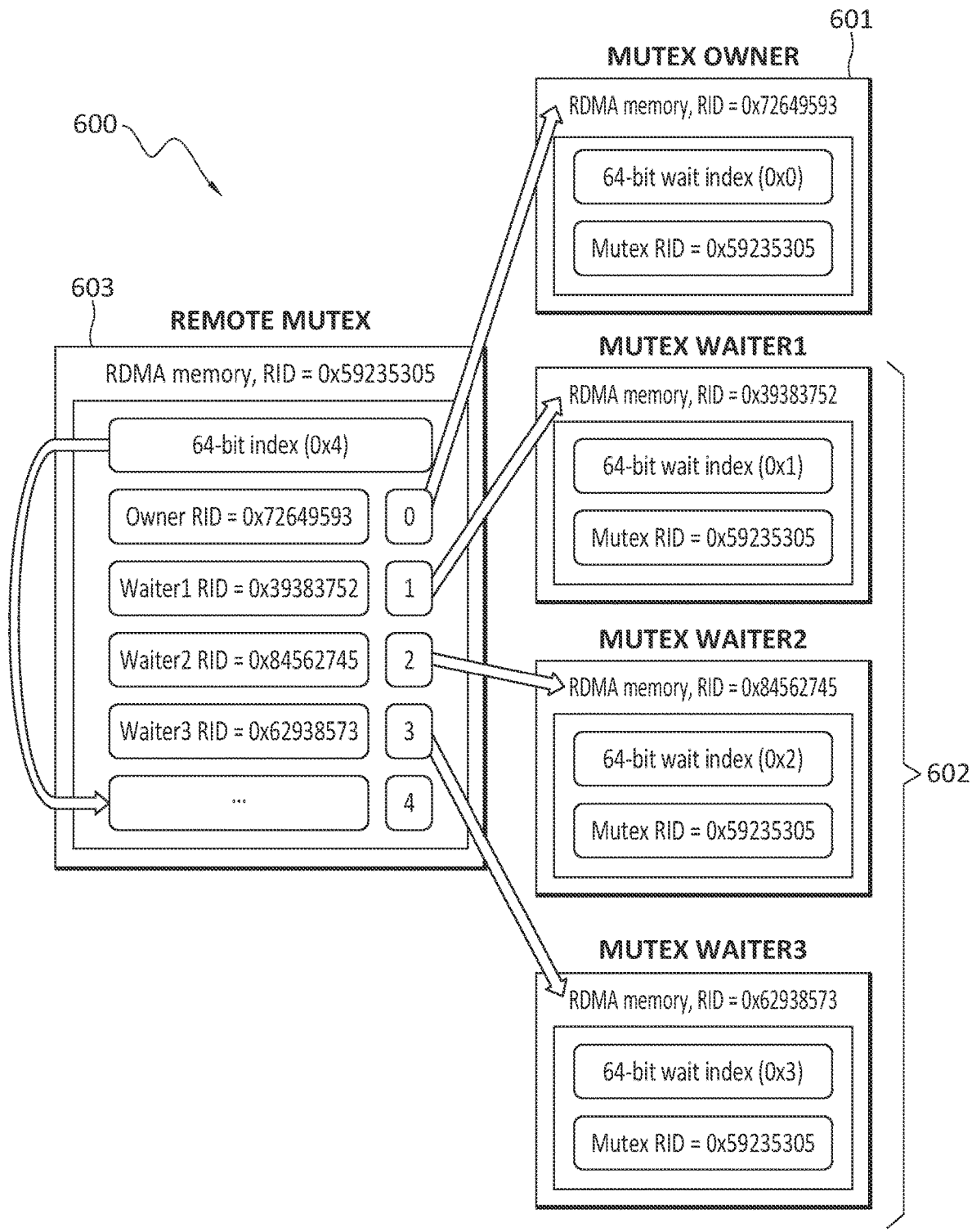
FIG. 6 discloses an arrangement similar to that of FIG. 5, with an additional mutex waiter.

FIGS. 5 and 6 disclose, respectively, configurations 500 and 600 that comprise mutex owners 501 and 601, and in which multiple mutex waiters 502, and multiple mutex waiters 602, continue to accumulate behind the mutex owners 501 and 601, respectively. Similar to the configuration disclosed in FIG. 4, each of the mutex waiters 502 and 602 includes a unique RID that is registered in the RDMA memory of the mutex. Likewise, each of the mutex waiters 502 and 602 has a respective 64 bit wait index value that reflects the position of that mutex waiter with respect to the other mutex waiters in terms of gaining ownership of the mutex 503 and 603, respectively.

Figure 7:
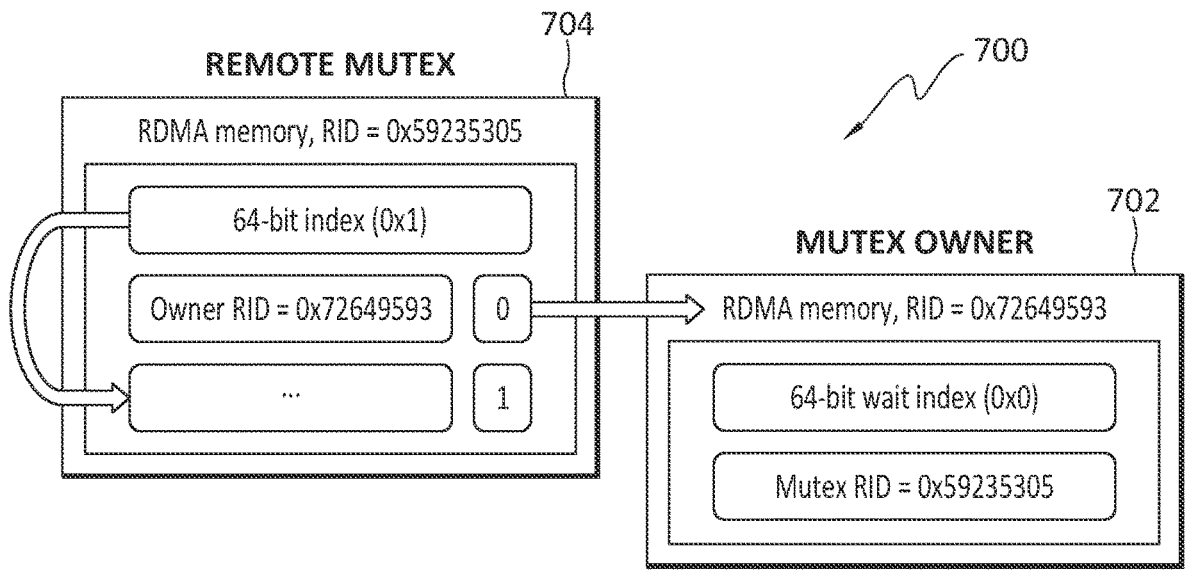
FIG. 7 discloses an arrangement in which a mutex owner is about to relinquish ownership of the mutex, and there are no mutex waiters.

With attention next to FIG. 7, a state 700 is disclosed in which a mutex owner 702, as indicated by the wait index of (0x0), is about to relinquish ownership of a mutex 704. In general, once the process or thread that owns the mutex has completed its usage of the resource(s) to which the mutex controls access, that owner may then relinquish its ownership of the mutex. Ownership of the mutex may, or may not, pass to a waiter.

In the particular example of FIG. 7, there are no waiters, and so the mutex owner 702 simply relinquishes ownership. Since there is only the mutex owner 702 and no waiters, the 64-bit index value of the mutex 704 is 1, that is (0x1). When the mutex owner 702 wants to relinquish ownership of the mutex 704, the first step taken by the mutex owner 702 is to perform an atomic compare and swap. Particularly, the mutex owner 702 may perform a compare of its wait index (0x0) plus 1, and a swap of 0 against the 64-bit index value, which is 1 in this example. If the compare succeeds, that is, if the wait index plus 1, or (0x0) plus 1 (that is, 0x1) in this case, equals the 64-bit index value of (0x1), then the mutex 704 is relinquished by swapping in the value of 0 for the 64-bit index value so that the 64-bit index value is now (0x0). Because there are no waiters in this example, the operation is now complete.

On the other hand, if the compare of (0x0) plus 1 and swap of 0 fails, that indicates there are 1 or more waiters that want to obtain ownership of the mutex 704. The wait index of the mutex owner 702, which was obtained when the mutex owner 702 was initially granted ownership of the mutex 704, may be used to determine which waiter should become the new owner of the mutex 704. This circumstance is discussed below in connection with FIG. 8.

Figure 8:
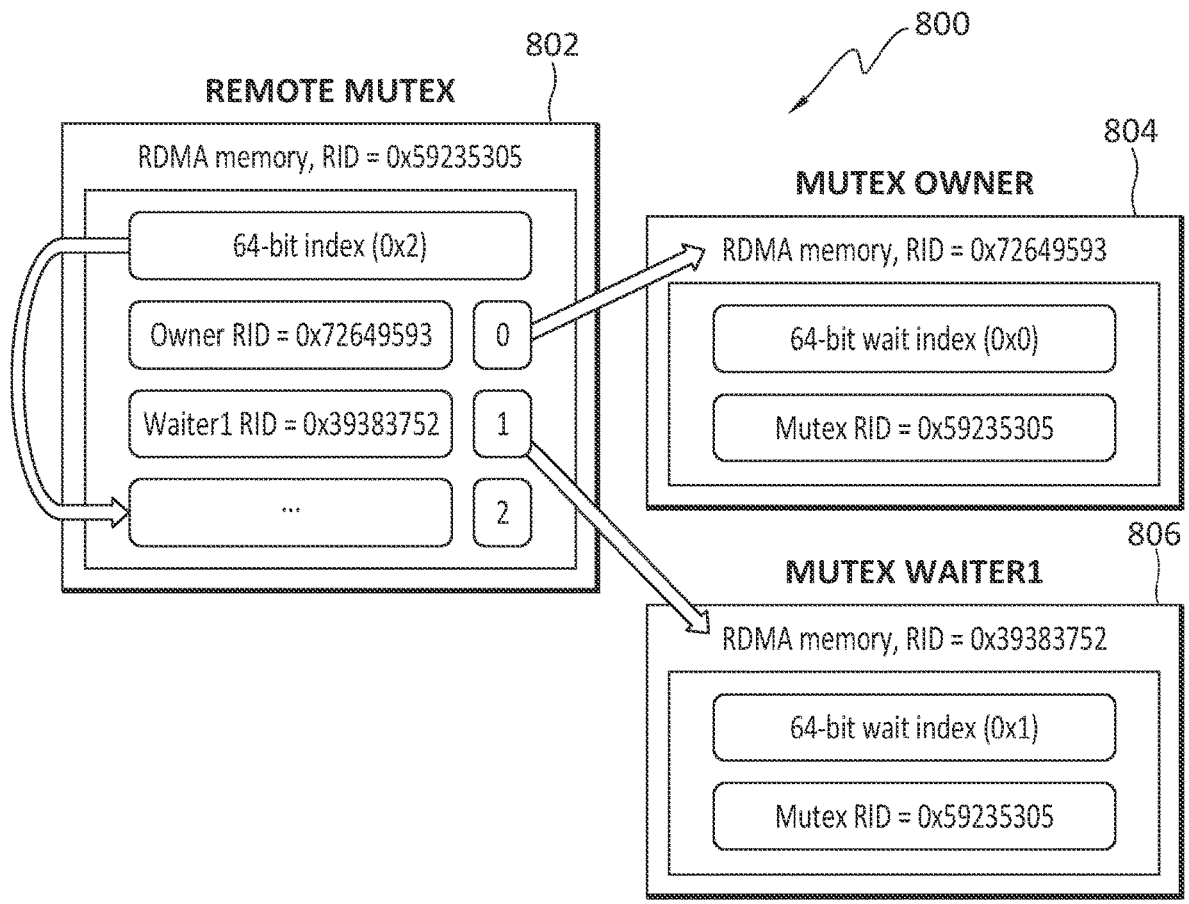
FIG. 8 discloses an arrangement in which a mutex owner is about to relinquish ownership of the mutex, and there is a mutex waiters that is waiting to take ownership of the mutex.

Particularly, FIG. 8 discloses a configuration 800 that includes a mutex 802, a mutex owner 804, and a waiter 806. When the owner tries to relinquish the mutex, a compare of 1 (0x0+1), that is, the mutex owner 804 wait index plus 1, and swap with 0 on the 64-bit index fails because the 64-bit index value is currently 2, that is (0x2). That is, the compare of 1 with the 64-bit index value of 2 fails. When this happens, it indicates that there is a waiter 806, and so the current mutex owner 804 does not simply relinquish ownership of the mutex 802 but must transfer ownership to the waiter 806.

The current mutex owner 804 may do this by looking at its own wait index (0x0) which was obtained when the mutex owner 804 initially requested ownership of the mutex 802. The mutex owner 804 may then add the value of 1 to its own wait index (0x0+1) and this index, now (0x1), will point to the client, waiter 806 in FIG. 8, that should become the new owner of the mutex 802. As shown in FIG. 8, the waiter 806, that has now taken ownership, has a 64-bit wait index of (0x1).

The current mutex owner 804 may also have to perform an atomic compare (of 0) and swap (of 1) of the waiter 806 RID located at its wait index plus 1(0x0+1) in the 64-bit index of the mutex 802. If the compare of 0 and swap of 1 is a success, this indicates a race condition where the waiter 806 was still in the process of requesting ownership but did not write its RID (0x39383752) for its remote wait memory yet. But, by swapping the 0 with a 1, this will tell the waiter 806 to transition itself to being the new owner and the current owner has completed the relinquish.

If the compare of 0 and swap of 1 fails, then the waiter 806 has successfully written its RID into the (0x0+1) slot of the 64-bit index of the mutex 802, so the remote mutex 802 may now issue an RDMA zero-length write to the waiter 806 RID and this will wakeup the waiter 806 which now automatically becomes the new owner of the mutex 802. When a waiter 806 is awakened to become the new owner of the mutex 802, the waiter 806 needs to write a zero to its wait index plus 1. This re-initializes the wait slot so the next waiter that uses the slot will see a 0 there and not the RID of the new owner, that is, the RID of the waiter 806.

B.2 Mutex Initialization

Figure 9:
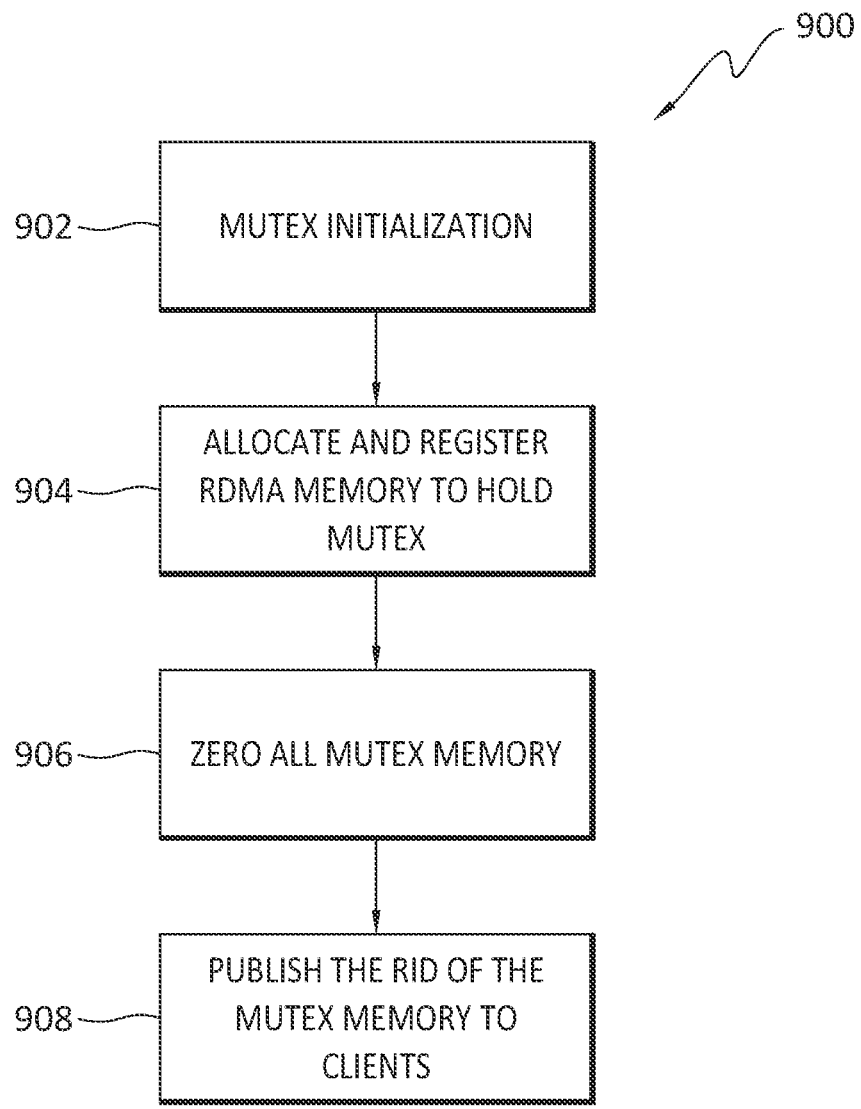
FIG. 9 discloses an example method for mutex initialization.

With reference now to FIG. 9, an example process 900 is disclosed for mutex initialization and setup. In general, the overall size of the mutex memory is determined by the maximum number of waiters that might be needed while the mutex is owned. A mutex will require a 64-bit atomic counter, referred to herein as the 'index' or '64-bit index,' and an optional location to hold the RID (remote ID) of the current mutex owner, and a pre-allocated list of waiters. Each waiter element only needs to hold a remote ID of registered RDMA memory that the waiter will block and wait for an RDMA post from. The RDMA post will trigger a waiter to wakeup and take ownership.

The example method 900 may begin with initialization of the mutex 902. After initialization 902, the method 900 may proceed to allocation and registration of RDMA memory 904 to hold the mutex that will control thread access to the RDMA. Next, the mutex memory may be zeroed 906. Finally, the RID of the mutex memory may be published 908 to the client(s) expected to need ownership of the mutex.

Following is example pseudo code that implements a mutex initialization. Note that in this example, the RDMA setup, RDMA memory registrations, exchange of RDMA memory handles, and other RDMA management details are not described. Only the pertinent fabric and atomic operations are described which are needed for implementing high-performance remote atomic synchronization.

```
struct {
    unsigned long L_index;
    unsigned long LID;
    RDMA_REMOTE_MEMORY remote_mutex_index;
    RDMA_REMOTE_MEMORY waiters[MAX_ WAITERS];
} remote_mutex;
void remote_mutex_init(struct remote_mutex *mutex)
{
    // Write a 64-bit 0 to the remote mutex index
    rdma_write64(mutex->remote_mutex_index, 0x0000000000000000);
    // Write 64-bit 0's to the remote waiter list
    for (int i=0; i<MAX_WAITERS; i++) {
        // Write a 64-bit 0 to the remote waiter
        rdma_write64(mutex->waiters[i], 0x0000000000000000);
    }
}
```

C. Example Mutex Lock and Unlock Methods

It is noted that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Figure 10:
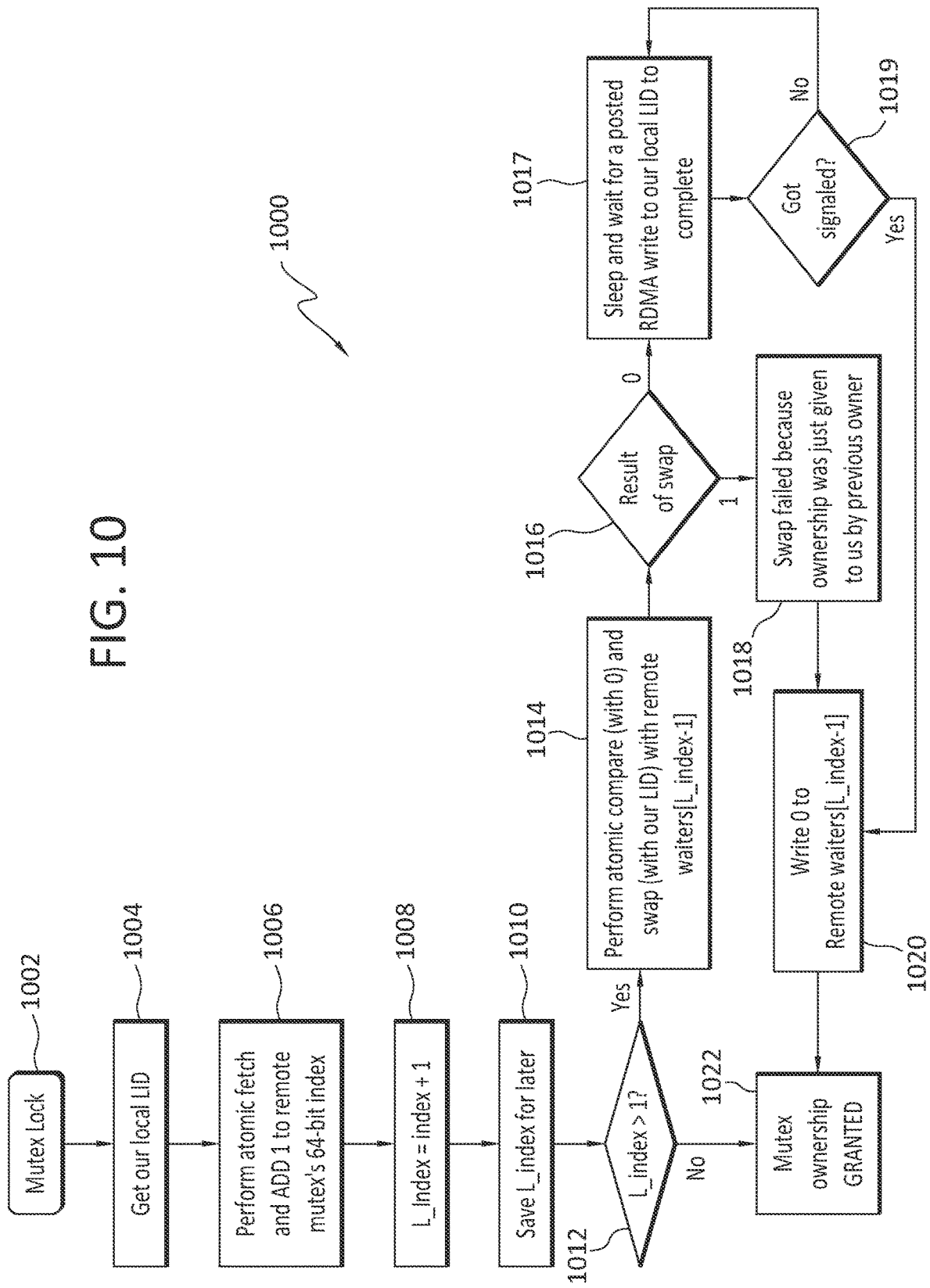
FIG. 10 discloses an example mutex locking method.

Directing attention now to FIG. 10, an example method 1000 for mutex locking is disclosed. The method 1000 may be performed in whole or in part by a client that wishes to gain ownership of a mutex. The method 1000 may begin with initiation 1002 of a mutex lock operation. Next the LID (Local ID) may be obtained 1004 for RDMA registered memory.

When the LID has been obtained 1004, an atomic fetch and add process 1006 may be performed that adds 1 to the 64-bit index value of the remote mutex and thus, the index becomes 1008 index+1 (L_index). The L_index may then be saved 1010. A check 1012 may then be performed to determine if L_index>1. If the result of the check 1012 is 'YES,' the method 1000 may proceed to 1014 where an atomic compare (with 0) and swap (with the LID) with remote waiters [L_index−1] is performed. The result of the swap may then be checked 1016. If the result of the swap is a 1, then the swap failed 1018 because ownership of the mutex has been given to the client by the previous owner of the mutex. At this point, the client that has taken ownership may then write 1020 a 0 to the remote waiters [L_index −1], and ownership of the mutex is granted Note that at 1012, if the L_index is not >1, the ownership of the mutex is granted In a case where the swap result is determined 1016 to be 0, the method 1000 may proceed to 1017 and the client may sleep and wait for a posted RDMA write to the client local ID to complete. If the client is signaled 1019 that a posted RDMA write has been performed, the method 1000 may proceed to 1020. On the other hand, if the client has not been signaled, the client may continue to sleep and wait 1017.

Following is an example of pseudo code for implementing the method 1000:

```
struct {
    unsigned long L_index;
    unsigned long LID;
    RDMA_REMOTE_MEMORY remote_mutex_index;
    RDMA_REMOTE_MEMORY waiters[MAX_ WAITERS];
} remote_mutex;
void remote_mutex_lock(struct remote_mutex *mutex)
{
    // Try to lock the mutex by atomically incrementing the remote
    //index by adding 1 and returning the result in L_index
    mutex->L_index = rdma_atomic_fetch_add64;
    (mutex>remote_mutex_index, 1)
    //Did we lock the mutex and gain exclusive ownership?
    if (mutex->L_index > 1) {
        // Perform remote atomic compare and swap with our unigue L_index
        // Compare with 0 and swap with mutex->LID
```

```
        if (rdma_atomic_compare_swap64(mutex->waiters
    [mutex->L_index-1], 0, mutex->LID) = = 0) {
            // Sleep and wait for the owner to wake us up with
            // a posted RDMA write to our local memory (LID)
            rdma_ wait_posted_write(mutex->LID);
        }
        // Write a 64-bit 0 to the remote waiters[L_index-1]
        rdma_write64(mutex->waiters[mutex->L_index-1],
        0x0000000000000000);
        }
        //Mutex is now owned...
    }
```

Figure 11:
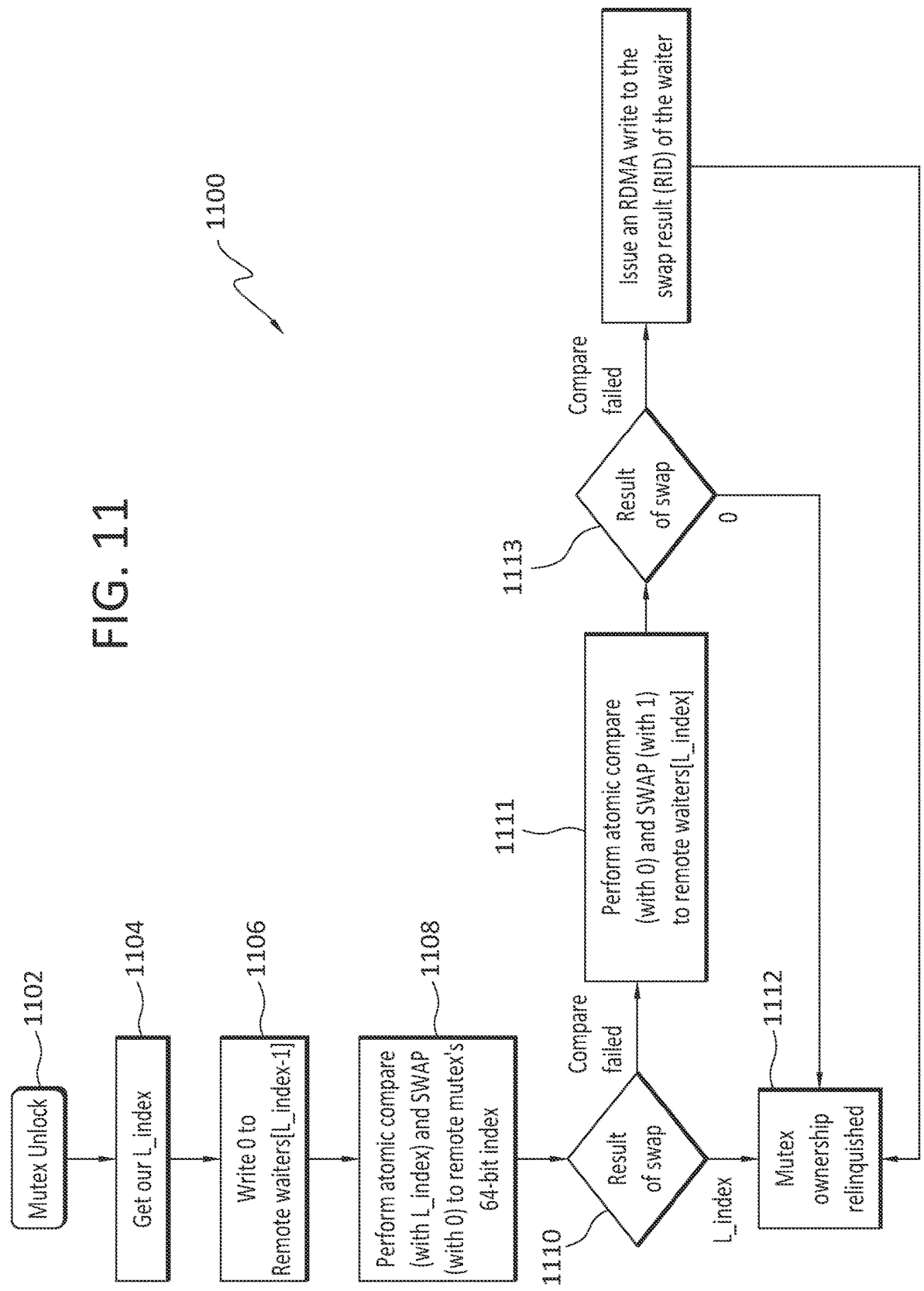
FIG. 11 discloses an example mutex unlocking method.

Directing attention now to FIG. 11, an example method 1100 for mutex unlocking is disclosed. The method 1100 may be performed in whole or in part by a client that wishes to relinquish its ownership of a mutex. The method 1100 may begin with initiation 1102 of a mutex unlock. Next the L_index for the client may be obtained 1104.

A value of 0 may then be written 1106 to the remote waiters [L_index−1]. After the 0 value has been written, an atomic compare and swap operation 1108 may be performed. In particular, the compare may be performed with the L_index and swap with the 0 value to the remote mutex 64-bit index. Next, the result of the swap may be checked 1110. If the compare was successful and the swap performed, then the client ownership of the mutex is relinquished 1112.

On the other hand, if the compare failed, an atomic compare and swap operation 1111 may be performed. In particular, the compare may be performed with the 0 value and swap with the 1 value to the remote waiter L_index. Next, the result of the swap may be checked 1113. If the compare was successful and the result of the swap was 0, then the client ownership of the mutex is relinquished 1112. On the other hand, if the compare failed, an RDMA write may be issued 1115 to the swap result (RID) of the waiter, and the mutex ownership thus relinquished 1112.

Following is an example of pseudo code for implementing the method 1100:

```
struct {
  unsigned long L_index;
  unsigned long LID;
  RDMA_REMOTE_MEMORY remote_mutex_index;
  RDMA_REMOTE_MEMORY waiters[MAX_ WAITERS];
} remote_mutex;
void remote_mutex_unlock(struct remote_mutex *mutex)
{
unsigned long RID;
unsigned long index;
    // Write a 64-bit 0 to our RID value
    rdma_write64(mutex->waiters[mutex->L_index-l],
    0x0000000000000000);
    // Perform remote atomic compare and SWAP with remote mutex index
    // Compare our L_index with the remote index and swap with 0 if equal
    index = rdma_atomic_compare_swap64(mutex->remote_mutex_index,
mutex->L_index, 0);
    // Check if the compare failed
    if (index != mutex->L_index) {
        // The compare failed. Perform an atomic compare and SWAP
        with the next waiter
        // Compare remote's RID with 0 and swap with 1.
        RID = rdma_atomic_compare_swap64(mutex->waiters[mutex-
        >L_index], 0,1);
        // Is this a race condition for the waiter to provide us their RID?
        If so we
        // just gave them ownership and they will see this by the value of 1
        that we just
        //swapped in. Otherwise, the waiter is already waiting so wake
        them up
        if (RID) {
            // Wakeup the new owner with a zero length RDMA write to
            their remote RDMA memory.
            rdma_zero_length_write64(RID);
        }
    // Mutex ownership relinquished
}
```

D. Further Discussion

As will be apparent from this disclosure, example embodiments may have a variety of useful features, although no embodiment is required to implement any particular feature(s). For example, embodiments may employ atomic RDMA compare and swap verbs to synchronize one or many compute resources with one or many compute remote resources located on any number of remote nodes/servers/domains. One or many compute resources can be signaled to wakeup and start executing on one or many remote nodes. Further, the posting of a zero-length RDMA write may be used to trigger a remote compute resource to "wakeup" and take ownership of a task. The latency associated with a zero-length RDMA write from a remote client and the associated completion interrupt can easily be completed within a generous sub-microsecond time interval (<1 us). Compared to TCP (100 us-1000 us), the approach implemented by example embodiments may be 100×-1000× times faster, and may reduce latency to the point that clustered and distributed/disaggregated compute operations are feasible to be performed in environments where a shared resource is located remotely from one or more clients that need access to the resource.

Another example feature of some embodiments is that such embodiments may use atomic RDMA fetch and add verbs to create remote counting semaphores that are actionable to one or many compute remote resources located on any number of remote nodes/servers/domains. The atomic RDMA fetch and add verb may provide a remote atomic counting mechanism that provides a remote atomic counter used for maintaining a consistent and coherent remote ownership counter. The atomic result of the counter may be used to decide if the requester has exclusive ownership of the semaphore or not. This allows a compute resource ownership of a shared object with a generous sub-microsecond time interval (<1 us) compared to TCP (100 us-1000 us), thus proving a potential 100×-1000× lower latency exclusive ownership decision to a compute resource. To illustrate, if a compute resource on node A wants exclusive ownership of a shared object among a cluster of 100 nodes, the exclusive ownership may be achieved in less than 1 microsecond in some embodiments, while other concurrent requesters will also be notified that they failed to obtain exclusive ownership also within 1 microsecond.

As a final example, some embodiments may use a combination of atomic RDMA compare and swap along with atomic fetch and add verbs to create a complete set of remote atomic synchronization objects such as semaphores, mutexes, critical sections, and spin locks. In these embodiments, at least, the remote or local scheduling is tied directly to the RNIC completion interrupt mechanism.

E. Further Example Embodiments

Following are some further example embodiments of the invention. These are presented only by way of example and are not intended to limit the scope of the invention in any way.

Embodiment 1. A method, comprising: in an operating environment comprising distributed and/or disaggregated compute nodes that communicate with each other and with a shared computing resource by way of an RDMA fabric, performing the following operations: obtaining, by a first one of the compute nodes, ownership of an atomic synchronization object that controls access to the shared computing resource; using, by the first compute node, the shared computing resource until the shared computing resource is no longer needed by the first compute node; and when the shared computing resource is no longer needed by the first compute node, relinquishing, by the first compute node, the ownership of the atomic synchronization object.

Embodiment 2. The method as recited in embodiment 1, wherein the atomic synchronization object is a mutex.

Embodiment 3. The method as recited in any of embodiments 1-2, wherein the relinquishing comprises relinquishing the ownership of the atomic synchronization object to a waiting second compute node.

Embodiment 4. The method as recited in any of embodiments 1-2, wherein the relinquishing comprises relinquishing the ownership of the atomic synchronization object without transferring ownership to a waiting compute node.

Embodiment 5. The method as recited in any of embodiments 1-4, further comprising, prior to the obtaining ownership of the atomic synchronization object: performing by the first compute node, an atomic fetch and add to an index of the atomic synchronization object, and defining a local index as the index+1; when the local index is not greater than 1, then the locking is performed; and when the local index is greater than 1, performing, by the first compute node, an atomic compare and swap, and when the swap result is a 0, the first compute node sleeps until awakened and then obtains ownership of the atomic synchronization object, and when the swap result is a 1, the swap is deemed as failed because the previous owner of the atomic synchronization object has granted ownership of the atomic synchronization object to the first compute Embodiment 6. The method as recited in embodiment 5, wherein the posting of a zero-length RDMA write is used to trigger the first compute node to wakeup and take ownership of a task involving the computing resource.

Embodiment 7. The method as recited any of embodiments 1-6, wherein the relinquishing of the ownership of the atomic synchronization object is performed in less than a microsecond.

Embodiment 8. The method as recited in any of embodiments 1-7, wherein the relinquishing of the ownership of the atomic synchronization object comprises performing the following operations by the first compute node: writing a 0 to a local index of the first compute node; performing an atomic compare and swap to the index of the atomic synchronization object and, when the swap succeeds, relinquishing ownership of the atomic synchronization object; when the compare fails, performing a second atomic swap and compare and when the result of the second swap is a 0, relinquishing ownership of the atomic synchronization object, and when the second compare fails, issuing an RDMA write to a swap result of a waiting compute node and then relinquishing ownership of the atomic synchronization object to the waiting compute node.

Embodiment 9. A system for performing any of the operations, methods, or processes, or any portion of any of these, disclosed herein.

Embodiment 10. A non-transitory storage medium having stored therein instructions that are executable by one or more hardware processors to perform operations comprising the operations of any one or more of embodiments 1-8.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 12:
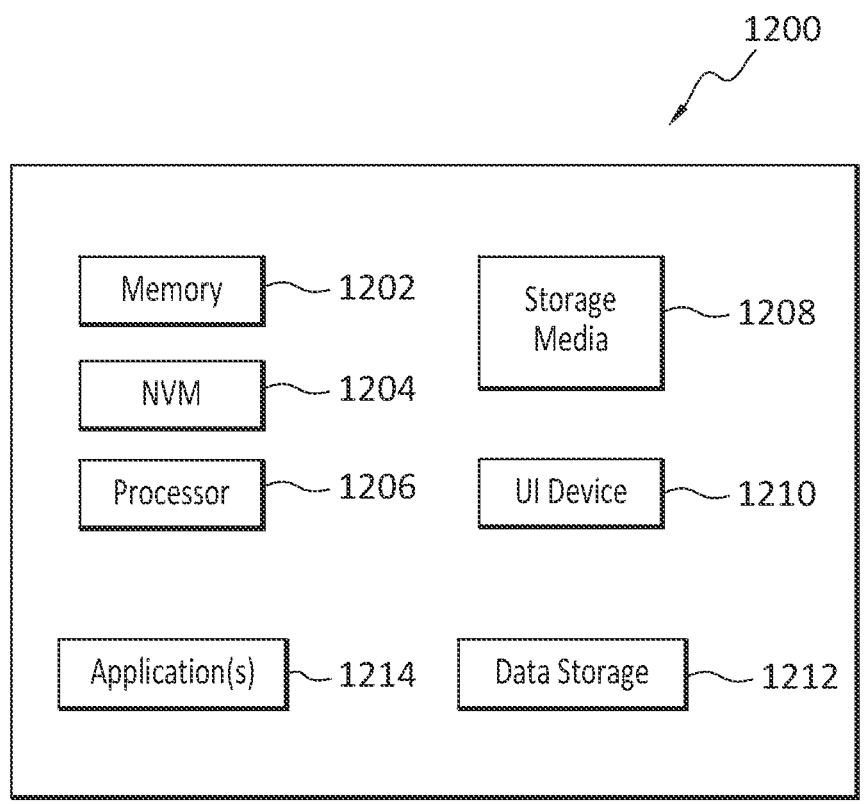
FIG. 12 discloses an example computing entity that is operable to perform any of the claimed methods, processes, and operations.

With reference briefly now to FIG. 12, any one or more of the entities disclosed, or implied, by FIGS. 1-11 and/or elsewhere herein, may take the form of, or include, or be implemented on, or hosted by, a physical computing device, one example of which is denoted at 1200. As well, where any of the aforementioned elements comprise or consist of a virtual machine (VM), that VM may constitute a virtualization of any combination of the physical components disclosed in FIG. 12. In the example of FIG. 12, the physical computing device 1200 includes a memory 1202 which may include one, some, or all, of random access memory (RAM), non-volatile memory (NVM) 1204 such as NVRAM for example, read-only memory (ROM), and persistent memory, one or more hardware processors 1206, non-transitory storage media 1208, UI device 1210, and data storage 1212. One or more of the memory components 1202 of the physical computing device 1200 may take the form of solid state device (SSD) storage. As well, one or more applications 1214 may be provided that comprise instructions executable by one or more hardware processors 1206 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
in an operating environment comprising distributed and/or disaggregated compute nodes that communicate with each other and with a shared computing resource by way of a remote direct memory access (RDMA) fabric, performing operations comprising:
obtaining, by a first one of the compute nodes, ownership of an atomic synchronization object that controls access to the shared computing resource, wherein the atomic synchronization object is a mutually exclusive object (mutex) and the mutex includes an index that comprises a table indexable by a mutex value, and indicating a number of unique compute nodes currently requesting for an access to the shared computing resource, and the mutex comprises an RDMA that is identified by an RDMA memory ID (RID) and is configured to store a maximum number of compute nodes waiting for use of the shared computing resource, and the compute nodes, before attempting to take ownership of the mutex, must obtain and pre-register the RID;
while the first one of the compute nodes has ownership of the atomic synchronization object, requesting, by a second one of the compute nodes, ownership of the atomic synchronization object, wherein the second one of the compute nodes is assigned a first index value;
after the second one of the compute nodes requests ownership of the atomic synchronization object, requesting, by a third one of the compute nodes, ownership of the atomic synchronization object, wherein the third compute node is assigned a second index value and the second index value is prioritized after the first index value;
using, by the first compute node, the shared computing resource until the shared computing resource is no longer needed by the first compute node;
when the shared computing resource is no longer needed by the first compute node, relinquishing, by the first compute node, the ownership of the atomic synchronization object; and
triggering the second one of the compute nodes to wakeup and take ownership of the atomic synchronization object.

2. The method as recited in claim 1, wherein the relinquishing comprises relinquishing the ownership of the atomic synchronization object to a waiting second compute node.

3. The method as recited in claim 1, wherein the relinquishing comprises relinquishing the ownership of the atomic synchronization object without transferring ownership to a waiting compute node.

4. The method as recited in claim 1, further comprising, prior to the obtaining ownership of the atomic synchronization object:
performing by the first compute node, an atomic fetch and add to the index of the atomic synchronization object, and defining a local index as the index+1;
when the local index is not greater than 1, granting ownership of the atomic synchronization object; and
when the local index is greater than 1, performing, by the first compute node, an atomic compare and swap,
wherein, when a swap result is 0, the first compute node sleeps until awakened and obtains ownership of the atomic synchronization object, and when the swap result is 1, the swap is deemed as failed because a previous owner of the atomic synchronization object has granted ownership of the atomic synchronization object to the first compute node.

5. The method as recited in claim 4, wherein a posting of a zero-length RDMA write is used to trigger the first compute node to wakeup and take ownership of a task involving the computing resource.

6. The method as recited in claim 1, wherein the relinquishing of the ownership of the atomic synchronization object is performed in less than a microsecond.

7. The method as recited in claim 1, wherein the relinquishing of the ownership of the atomic synchronization object comprises performing the following operations by the first compute node:
writing 0 to a local index of the first compute node;
performing an atomic compare and swap to the index of the atomic synchronization object and, when the swap succeeds, relinquishing ownership of the atomic synchronization object; and
when the compare fails, performing a second atomic swap and compare and when a result of the second atomic swap and compare is 0, relinquishing ownership of the atomic synchronization object, and when the second compare fails, issuing an RDMA write to a swap result of a waiting compute node and relinquishing ownership of the atomic synchronization object to the waiting compute node.

8. A non-transitory storage medium having stored therein instructions that are executable by one or more hardware processors to perform operations comprising:
obtaining, by a first one of the compute nodes, ownership of an atomic synchronization object that controls access to the shared computing resource, wherein the atomic synchronization object is a mutually exclusive object (mutex) and the mutex includes an index that comprises a table indexable by a mutex value, and indicating a number of unique compute nodes currently requesting for an access to the shared computing resource, and the mutex comprises an RDMA that is identified by an RDMA memory ID (RID) and is configured to store a maximum number of compute nodes waiting for use of the shared computing resource, and the compute nodes, before attempting to take ownership of the mutex, must obtain and pre-register the RID;
while the first one of the compute nodes has ownership of the atomic synchronization object, requesting, by a second one of the compute nodes, ownership of the atomic synchronization object, wherein the second one of the compute nodes is assigned a first index value within the index;
after the second one of the compute nodes requests ownership of the atomic synchronization object, requesting, by a third one of the compute nodes, ownership of the atomic synchronization object, wherein the third compute node is assigned a second index value within the index and the second index value is prioritized after the first index value;
using, by the first compute node, the shared computing resource until the shared computing resource is no longer needed by the first compute node;
when the shared computing resource is no longer needed by the first compute node, relinquishing, by the first compute node, the ownership of the atomic synchronization object, wherein the group of compute nodes comprises distributed and/or disaggregated compute nodes that communicate with each other and with the shared computing resource by way of an RDMA fabric; and
triggering the second one of the compute nodes with the first index value to wakeup and take ownership of the atomic synchronization object.

9. The non-transitory storage medium as recited in claim 8, wherein the relinquishing comprises relinquishing the ownership of the atomic synchronization object to a waiting second compute node.

10. The non-transitory storage medium as recited in claim 8, wherein the relinquishing comprises relinquishing the ownership of the atomic synchronization object without transferring ownership to a waiting compute node.

11. The non-transitory storage medium as recited in claim 8, wherein the operations further comprises, prior to the obtaining ownership of the atomic synchronization object:
performing by the first compute node, an atomic fetch and add to the index of the atomic synchronization object, and defining a local index as the index+1;
when the local index is not greater than 1, granting ownership of the atomic synchronization object; and
when the local index is greater than 1, performing, by the first compute node, an atomic compare and swap,
wherein, when a swap result is 0, the first compute node sleeps until awakened and obtains ownership of the atomic synchronization object, and when the swap result is 1, the swap is deemed as failed because a previous owner of the atomic synchronization object has granted ownership of the atomic synchronization object to the first compute node.

12. The non-transitory storage medium as recited in claim 11, wherein a posting of a zero-length RDMA write is used to trigger the first compute node to wakeup and take ownership of a task involving the computing resource.

13. The non-transitory storage medium as recited in claim 8, wherein the relinquishing of the ownership of the atomic synchronization object is performed in less than a microsecond.

14. The non-transitory storage medium as recited in claim 8, wherein the relinquishing of the ownership of the atomic synchronization object comprises performing, by the first compute node:
writing 0 to a local index of the first compute node;
performing an atomic compare and swap to the index of the atomic synchronization object and, when the swap succeeds, relinquishing ownership of the atomic synchronization object; and
when the compare fails, performing a second atomic swap and compare and when a result of the second atomic swap and compare is 0, relinquishing ownership of the atomic synchronization object, and when the second compare fails, issuing an RDMA write to a swap result of a waiting compute node and relinquishing ownership of the atomic synchronization object to the waiting compute node.

* * * * *